United States Patent [19]
Maxam

[11] 3,817,581
[45] June 18, 1974

[54] MODEL VEHICLE WHEEL STRUCTURE

[76] Inventor: Allen B. Maxam, 218 W. Palm, Burbank, Calif. 91502

[22] Filed: July 14, 1972

[21] Appl. No.: 271,915

[52] U.S. Cl.............. 301/6 R, 301/63 DD, 301/111
[51] Int. Cl............................................. B60b 19/00
[58] Field of Search........ 301/6 E, 6 R, 1, 111, 122, 301/63 DD; 308/15, 16; 46/221

[56] References Cited
UNITED STATES PATENTS

| | | | |
|---|---|---|---|
| 2,189,464 | 2/1940 | Frisbie | 301/111 |
| 2,560,856 | 7/1951 | Franta | 308/15 |
| 2,566,111 | 8/1951 | Baggott | 301/1 |
| 2,592,164 | 4/1952 | Maxam | 301/63 DD |
| 2,723,162 | 11/1955 | Gross | 308/16 X |
| 3,321,863 | 5/1967 | Maxam | 301/111 |

FOREIGN PATENTS OR APPLICATIONS

| | | | |
|---|---|---|---|
| 635,191 | 4/1950 | Great Britain | 301/6 R |

Primary Examiner—Robert S. Ward, Jr.
Assistant Examiner—Reinhard J. Eisenzopf

[57] ABSTRACT

A vehicle wheel structure for toy airplanes and the like in which a hub on which is mounted a solid resilient tire has an axially extending bearing aperture providing a rotatable bearing for a straight axle. Intermediate opposite ends of the bearing aperture is an annular pocket in which is contained a cylindrical block of synthetic plastic resin material having an axial bore in which the axle is snugly received to releasably hold the hub on the axle. A brake housing on the hub has complementary friction braking surfaces and complementary cam means on a stationary hub on the vehicle act to urge the braking surfaces into braking engagement with each other.

14 Claims, 13 Drawing Figures

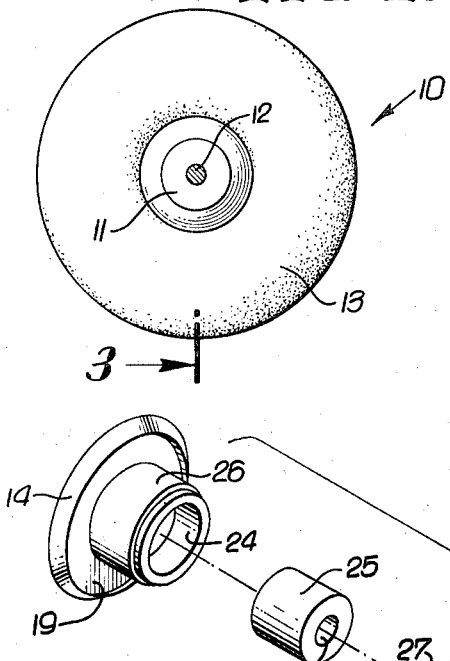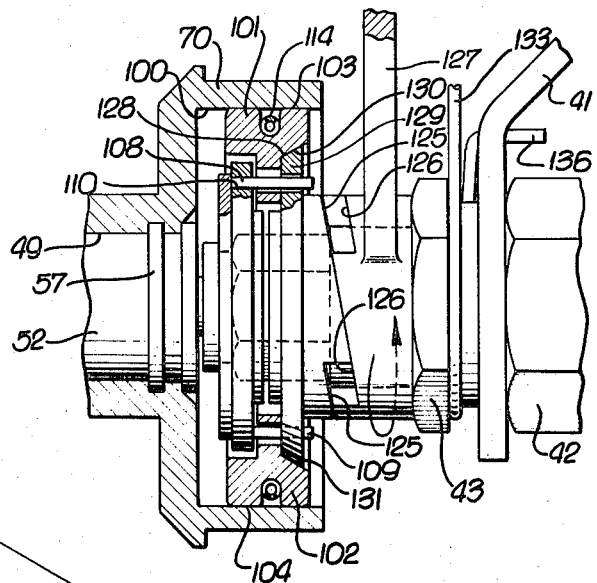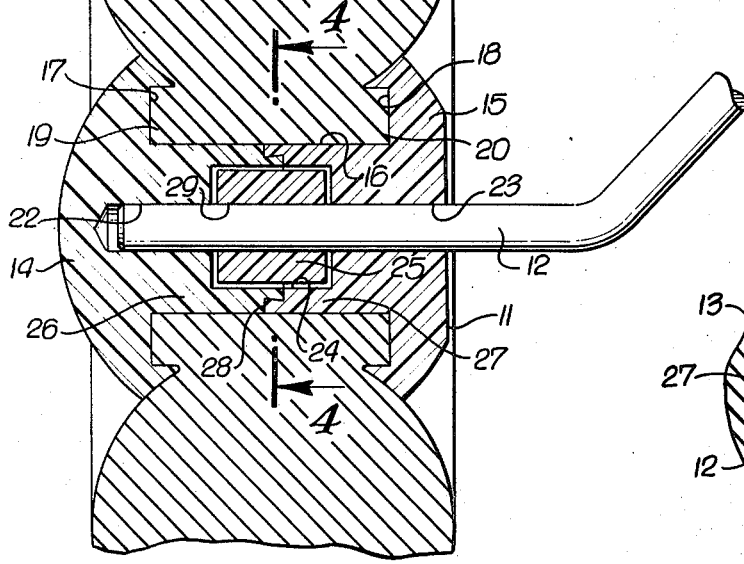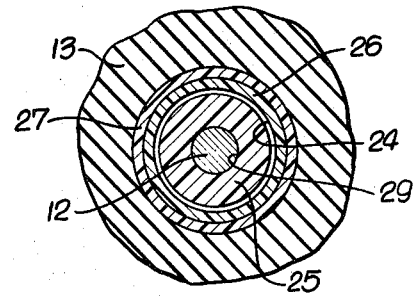

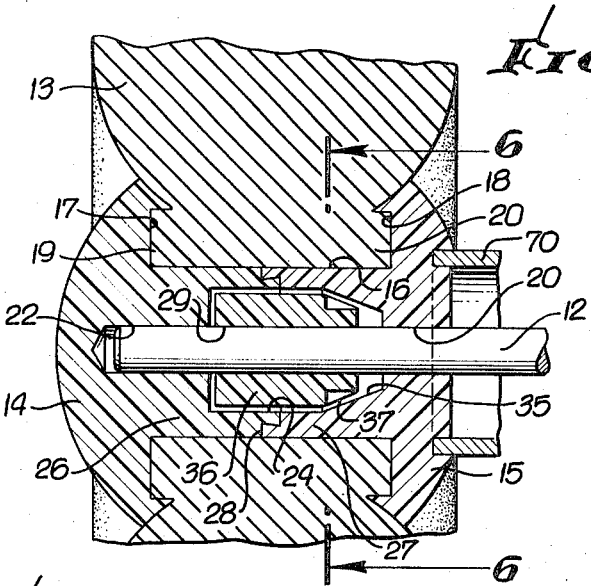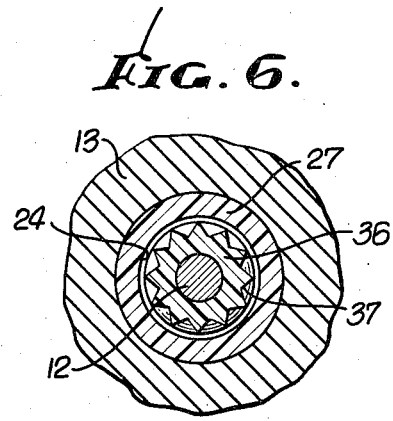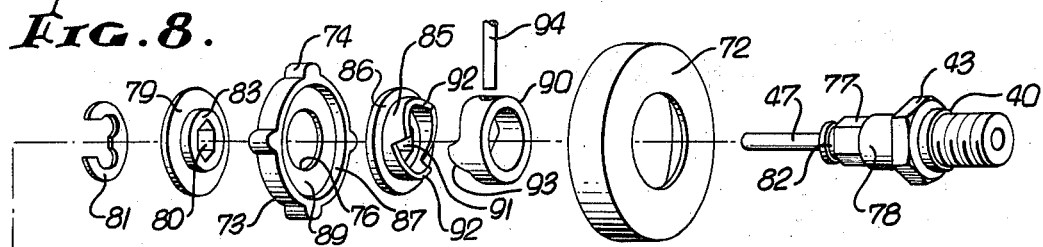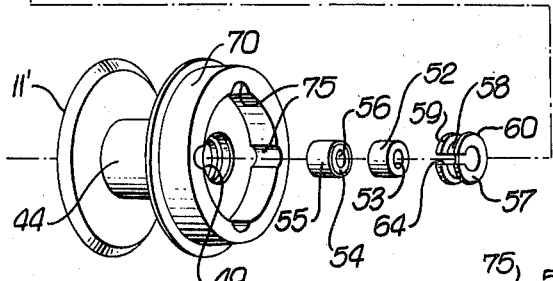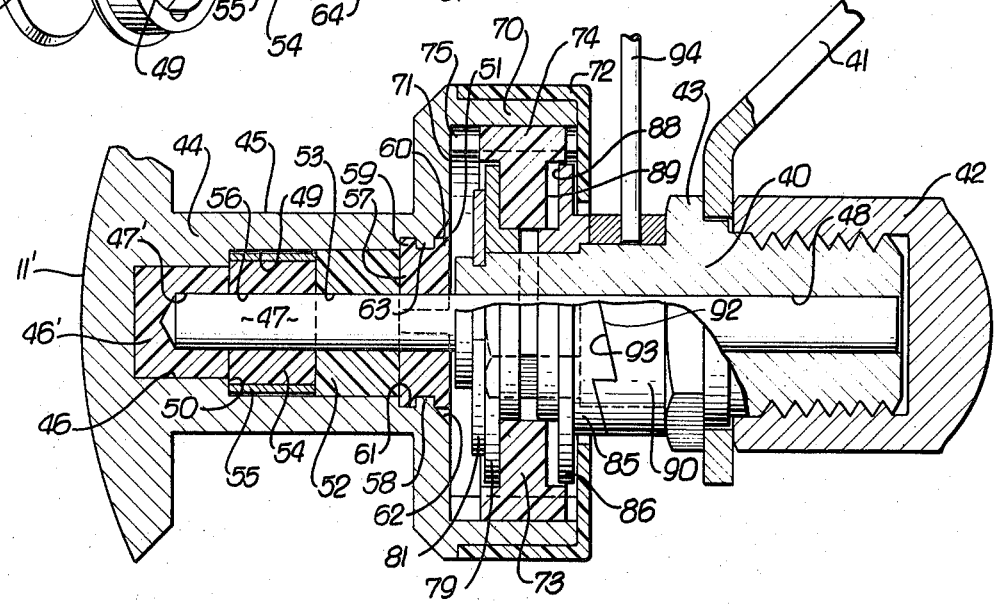

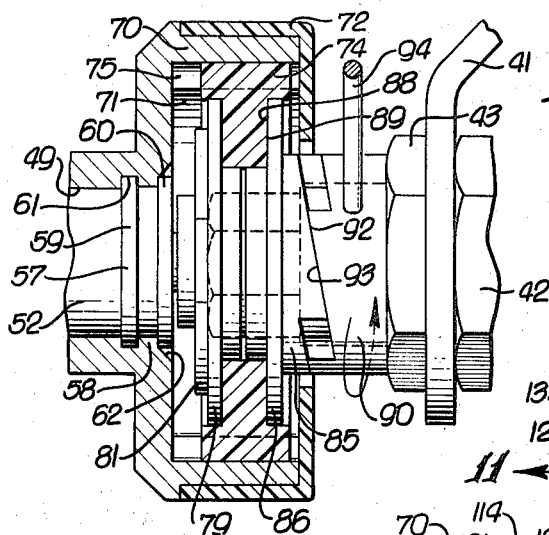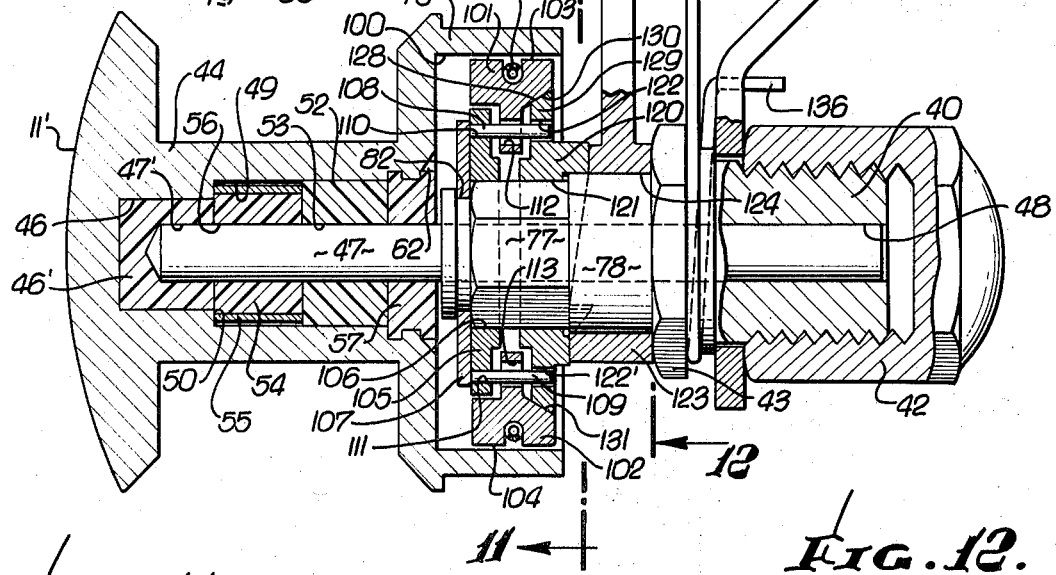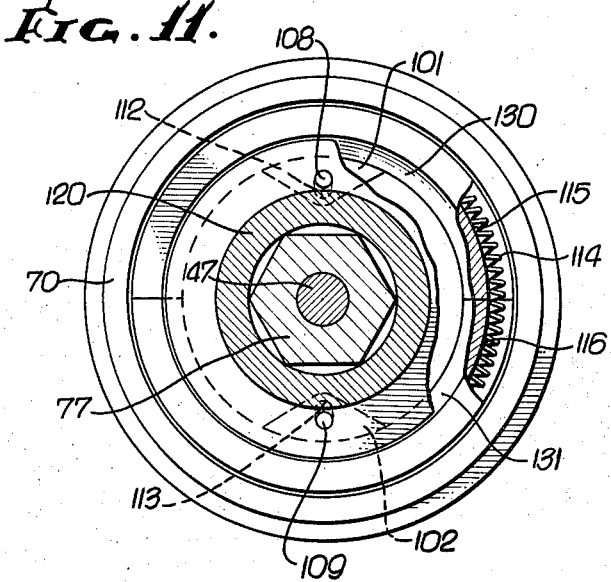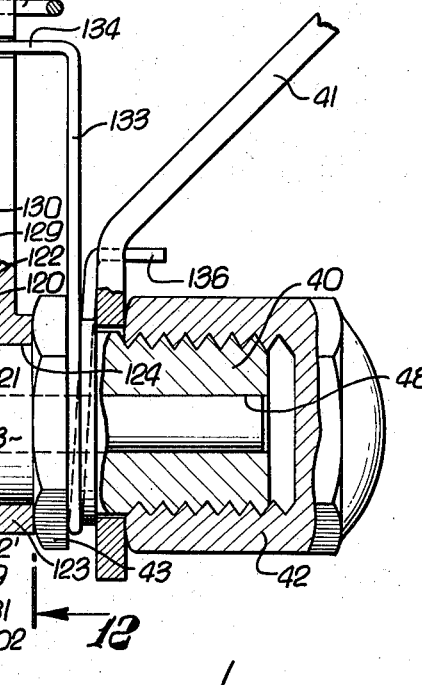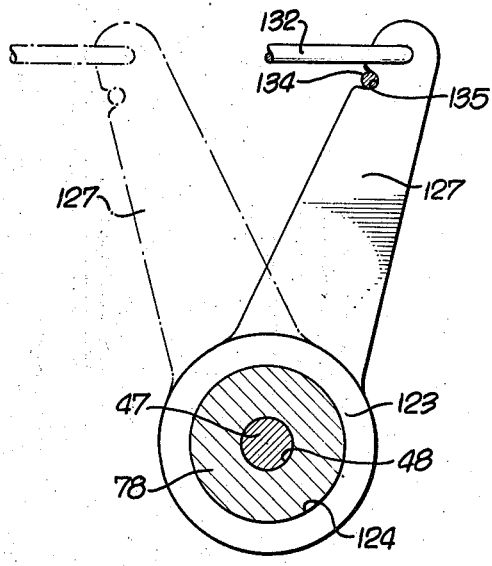

MODEL VEHICLE WHEEL STRUCTURE

The current day trend in model building comprehends some quite finished and mechanically advanced vehicles many of which are electrically controlled and electronically operated either by direct connections or a radio control. Examples of these are model racing cars and model airplanes. Since such devices include wheels, such wheels for maximum performance must be capable not only of supporting whatever the vehicle happens to be but also be dependably smooth rolling and mounted in such fashion that, though removable, they will be securely held in place as long as their rolling function is necessary.

Obviously also, in addition to being sturdy enough to carry a relatively heavy load of equipment at what is conventionally considered high speed for a model vehicle, wheel structures need to be simple, easy to handle and relatively inexpensive. Since such structures do become damaged, they must be capable of being readily removed and replaced.

It is therefore among the objects of the invention to provide a new and improved model vehicle wheel structure in which the bearing means is stable and dependable and which, though capable of being readily removed and replaced, is of such construction that it will not work free of the vehicle during normal operation.

Another object of the invention is to provide a new and improved model vehicle wheel structure which is sturdy, light in weight, smooth acting, and which can be constructed relatively inexpensively without sacrifice in dependability.

Still another object of the invention is to provide a new and improved model airplane wheel structure which is capable of having a comparatively large tire mounted on it in such fashion that during landing the tire will stay in place and the wheel will rotate with a dependable degree of smoothness, the structure moreover being such that it can be easily removed and replaced.

Still further among the objects of the invention is to provide a new and improved model vehicle wheel structure capable of being fastened securely to a conventional axle, non-deformed in any particular, the wheel structure having a bearing support extending over a relatively long length of the axle to improve smoothness and dependability of operation and which can be readily removed and replaced quickly, and with no more complicated movement than merely pulling the wheel itself endwise relative to the axle to remove it and pressing it into engagement with the axle for replacement.

Also included among the objects of the invention is to provide on an improved model wheel structure a friction brake which is positive acting, sensitive in operation, which accommodates itself to gradual controlled application, which releases substantially automatically, and which is of such construction that it can be readily removed for servicing and replacement of parts.

With these and other objects in view, the invention consists in the construction, arrangement and combination of the various parts of the invention, whereby the objects contemplated are attained, as hereinafter set forth, pointed out in the appended claims, and illustrated in the accompanying drawings.

In the drawings:

FIG. 1 is a side elevational view of the wheel structure in simple form, exclusive of a brake.

FIG. 2 is an exploded view of the hub and axle of FIG. 1.

FIG. 3 is a longitudinal sectional view on the line 3 — 3 of FIG. 1;

FIG. 4 is a fragmentary cross-sectional view on the line 4 — 4 of FIG. 3.

FIG. 5 is a fragmentary longitudinal sectional view of a second form of the device.

FIG. 6 is a fragmentary cross-sectional view on the line 6 — 6 of FIG. 5.

FIG. 7 is a longitudinal sectional view of a form of the device which incorporates a brake.

FIG. 8 is an exploded view of the parts of the device of FIG. 7.

FIG. 9 is a fragmentary view similar to FIG. 7 but showing the brake applied.

FIG. 10 is a longitudinal sectional view of a second form of brake device.

FIG. 11 is a cross sectional view on the line 11 — 11 of FIG. 10.

FIG. 12 is a cross sectional view on the line 12 — 12 of FIG. 10.

FIG. 13 is a fragmentary view similar to FIG. 10 but showing the brake applied.

In an embodiment of the invention chosen for the purpose of illustration there is shown a model vehicle wheel structure identified generally by the reference character 10 consisting mainly of a hub 11, an axle 12, and a tire 13. The hub has an enlarged outer portion 14 forming in effect a cap and an inner portion 15 between which is an annular tire receiving recess 16 having undercut sides 17 and 18 for reception of flanges 19 and 20 of the tire 13.

Extending centrally through the hub 11 is a bearing aperture having an outer part 22 and an inner part 23, both of which have a bearing engagement with the axle 12 at corresponding locations.

Intermediate the outer and inner parts 22 and 23 is an annular pocket 24 in which is located a block 25 of a material such as a synthetic plastic resin material having low friction surface characteristics and a certain amount of resilience. In the embodiment of FIG. 3 the block 25 has a diameter slightly less than the diameter of the pocket 24 and a length slightly less than the length of the pocket.

In this form of the device the hub 11 is initially formed of two parts, namely, an outer part 26 and an inner part 27, formed separately and ultimately adhesively joined along a mid-line 28. In this way parts ultimately forming the pocket 24 can be readily made and the block can be mounted in its position within the pocket when the two parts 26 and 27 are brought together and attached to each other.

Extending centrally through the block 25 is an axial bore 29 of about the same inside diameter as the outside diameter of the axle 12, or slightly smaller, whereby to provide a snug friction engagement between the axle and the block.

When the wheel structure is to be applied to the axle 12, the axle is merely inserted into the inner part 23 of the bearing aperture and pushed through the axial bore 29 in the block 25 until the outer free end of the axle 12 is forced into the outer part 22 of the bearing aperture.

There is a free rotating engagement between the axle and the hub 11 at the outer and inner parts 14 and 15, respectively, so that the wheel structure rotates smoothly, evenly and dependably upon the axle 12. On the other hand, there is a non-sliding, non-rotating connection between the block 25 and the axle 12 so that once the axle is gripped by the block, the wheel structure cannot be readily dislodged from the axle except intentionally pulling it endwise from the axle. This endwise pulling is the means by which the wheel structure is removed from the axle when there is need to replace it by another comparable wheel structure, and may be described as a press fit.

For some types of structures it may be preferable to provide adjacent the inside end of the pocket 24 an annular tapered wall 35 and to provide a block 36 with a tapered end 37 complementary to the annular tapered wall 35 so that when there is a tendency to pull the hub in a direction outwardly as, for example, removing it from the axle 12, the cooperating tapers of the tapered wall 35 and tapered end 37 will wedge the block 36 in snugger engagement with the axle 12 and therefore assist in preventing inadvertent removal. For improved performance, the tapered end 37 may be serrated.

In one form of brake construction shown in FIG. 7, 8, and 9 use is made of a wheel hub 11' and a hub shaft 40 which is secured to a strut 41 of a vehicle such as a toy airplane by employment of a cap nut 42 which, acting agains a flange 43 on the hub shaft 40 mounts the wheel structure to the vehicle. A shank 44 of the hub shaft provides a recess 45 for mounting a tire like the tire 13 already made reference to.

In an opening 46 in the shank 44 is a bearing block 46' of synthetic plastic low friction material in which is an aperture 47' for the accommodation of an axle 47. A bearing aperture 48 in the hub shaft 40 is in axial alignment with the bearing aperture 47' and accommodates the end of the axle 47 opposite from the end accommodated by the bearing aperture 47'.

For holding the hub 11' on the axle 47 there is provided a pocket 49 immediately adjacent the bearing aperture 47', the pocket having an annular shoulder 50 at the bottom and an open end 51.

In the pocket is located a block 52 of an appropriate synthetic plastic resin material through which is a bearing aperture 53 through which the axle 47 extends. Between the block 52 and the bottom wall 50 of the pocket is a retention block 54 of an appropriate synthetic plastic resin material enveloped by a sleeve 55 which may be of metal. Within the retention block 54 is a bore 56 of the same diameter as the outside diameter of the axle 47, or slightly smaller, providing a friction fit which can be released only by exercise of some appreciable lengthwise pull. The outside diameter of the sleeve 55 is slightly smaller than the diameter of the pocket 49 so that the retention block can rotate freely.

To hold the block 52 and retention block 54 in place there is provided a split collar 57 around the circumference of which is an annular groove 58 providing annular flanges 59 and 60. In the pocket 49 is an annular recess 61 which receives the flange 59, the flange 60 lying outside in a recess 62. An annular projection 63 is adapted to extend into the annular recess 58.

By providing the collar 57 with a slit 64, shown in FIG. 8, the collar can be squeezed together sufficient to insert it into the position shown in FIG. 7 where, upon expansion so that the recesses and flanges interengage, the split collar becomes a lock collar preventing removal of the wheel hub 11' from the axle 47.

On the wheel hub 11', or more appropriately on the shank 44, is a cylindrical brake housing 70 providing a brake chamber 71. A dust cap 72 fits over the brake housing 70 and extends over the open end of the brake chamber 71.

In this form of the device a disc member 73 serving as a friction breaking element has circumferentially spaced lugs 74 adapted to be received in appropriate slots 75 thereby serving to hold the disc member non-rotatably in the brake housing 70. A central opening 76 in the disc member 73 allows it to freely surround the structure on which it is mounted.

As shown to good advantage in FIG. 8, the hub shaft 40 has a hexagonal portion 77 and between the hexagonal portion 77 and the flange 43 is a cylindrical portion 78. A retaining collar 79 has a central hexagonal opening 80 which, when fitting over the hexagonal portion 77 of the hub shaft mounts the retaining collar non-rotatably on the hub shaft. A lock washer 81 fitting in a groove 82 locks the retaining collar on the hub shaft. A projection 83 on the retaining collar fits rotatably within the opening 76 of the disc member 73.

A first brake actuating sleeve 85 has on it an annular flange 86 which is adapted to fit within a dished opening 87 of the disc member 73 so that a surface 88 of the first brake actuating sleeve 85 frictionally engages an annular surface 89 of the disc member when braking action is to take place.

A second brake actuating sleeve 90 is mounted rotatably upon the cylindrical portion 78 of the hub shaft 40 whereas the first brake actuating sleeve 85, having a central hexagonal opening 91 is mounted non-rotatably upon the hexagonal portion 77 of the hub shaft 40. The first brake actuating sleeve however, is free to move a short distance axially.

Cam faces 92 of the first brake actuating sleeve engage cam faces 93 of the second brake actuating sleeve so that when the second brake actuating sleeve 90 is rotated by action of a lever 94 the cam faces 92 and 93 engage and the first brake actuating sleeve is pushed in a direction from right to left as viewed in FIGS. 7 and 8 whereby to move the surface 88 of the first brake actuating sleeve into sliding frictional engagement with the annular surface 89 of the disc member 73. The movement is from the position of those parts shown in FIG. 7 to those parts shown in FIG. 9. This happens because, although the second brake actuating sleeve is free to rotate the first brake actuating sleeve is non-rotatable and is therefore shifted axially from right to left as viewed in FIG. 7 and 8. In this way braking action takes place. When braking action is to be relieved the lever 94 is merely released and since there is no more exertion of pressure between the surfaces 88 and 89 no further braking action will be experienced and the wheel hub 11' will be free to rotate.

In the form of the brake shown in FIGS. 10, 11, 12, and 13 the brake housing 70 is provided with an inner cylindrical friction surface 100. A pair of brake shoes 101 and 102 presents semi-cylindrical friction surfaces 103 and 104 respectively which are adapted when extended from the positions of FIG. 10 to the positions of FIG. 13 to engage the cylindrical friction surface thereby to apply a braking effect.

To properly mount the brake shoes 101 and 102 there is provided a mounting collar 105 in which is a hexagonal opening 106 adapted to fit non-rotatably over the hexagonal portions 77 of the hub shaft 40. A lock washer 107 similar to the lock washer 81 holds the mounting collar 105 in position.

Mounting pins 108 and 109 fit in appropriate openings 110 and 111 respectively in the mounting collar. In the brake shoe 101 is an elongated slot 112 and in the brake shoe 102 is a similar elongated slot 113. These slots accommodate the respective mounting pins 108 and 109, preventing rotation of the respective brake shoes 101, 102 but at the same time allowing them to extend and retract. Retraction is achieved automatically by employment of a spring 114 which fits in appropriate circumferential recesses 115 and 116 in the brake shoes.

A first brake actuating sleeve 120 has a hexagonal opening 121 which permits the sleeve to fit non-rotatably upon the cylindrical portion 78 of the hub shaft 40 while at the same time permitting it to shift axially. Openings 122 and 122' freely and slidably receive respective mounting pins 108 and 109 whereby movement of the brake actuating sleeve is guided by the mounting pins.

A second brake actuating sleeve 123 has a cylindrical opening 124 which allows the second brake actuating sleeve to fit rotatably upon the cylindrical portion 78 of the hub shaft 40.

Cam faces 125 of the first brake actuating sleeve 120 cooperate with cam faces 126 on the second brake actuating sleeve 123 so that when the second brake actuating sleeve 123 is rotated by movement of a brake arm 127 the first brake actuating sleeve 120 will be shifted axially in a direction from right to left as viewed in FIGS. 10 and 13. When this occurs an oblique circumferential cam surface 128 on a flange 129 of the first brake actuating sleeve 120 moves against an oblique partially circumferential cam surface 130 of the brake shoe 101 and against a similar partial circumferential cam surface 131 of the brake shoe 102. Action of the last identified cam surfaces has the effect of moving the brake shoes 101, 102 radially outwardly until the respective friction surfaces 103, 104 engage the cylindrical friction surface 101 of the brake housing 70 whereby to produce a braking effect.

In the last described form a link 132 is applied to the brake arm 127 and a torsion spring 133 has one leg 134 in engagement in a notch 135 of the brake arm 127 and another leg 136 in engagement against the strut 41. Having reference to FIG. 12, when the brake is to be applied the brake arm 127 is moved counterclockwise to the broken line position of FIG. 12, building up spring energy in the torsion spring 133 after which, when the brake arm is released, the spring returns the brake arm 127 clockwise to the solid line position of FIG. 12.

From an examination of the manner in which the axle 12, or the axle 47 as the case may be, is retained it will be clear that there is good bearing support for the wheel hub on the axle at spaced locations thereby to preserve good alignment and positive ease of rotation. This spacing is taken advantage of in all forms of the device. In the forms of device featuring a brake mechanism the end of the axle 47 opposite from the end retained in the wheel hub is also supported over a considerable portion of its length namely throughout virtually the entire length of the hub shaft 40 in each instance. Appreciably durability is thus built into the wheel structure.

It is additionally true that in all forms of the device the wheel hub can be readily removed from the vehicle by merely pulling it length-wise relative to the axle, with sufficient force to slide the retention block 54, in the case of FIGS. 7 through 13 inclusive, or the retention block 25 in the case of FIGS. 1 through 6 inclusive, relative to the axle and far enough to entirely clear the axle. Remounting is achieved by merely forcably pushing the wheel hub again onto the axle.

When the brake mechanism is to be serviced or replaced the wheel is first removed in the manner described and then simply by removing the lock washer 81, or 107 as the case may be, engagement of the brake elements is relieved and they can be readily disassembled. The simple disassembly and assembly technique inherent in the structure described, a friction fit being primarily relied on. Small model vehicles are thereby made easy to work with, build, service, and repair which would not otherwise be possible by resort to conventional means for fastening devices like wheels to a vehicle.

Accordingly, while the invention has herein been shown and described in what is conceived to be its most practical and preferred embodiment, it is recognized that departures may be made therefrom within the scope of the invention, which is not to be limited to the details disclosed herein, but is to be accorded the full scope of the claims so as to embrace any and all equivalent devices.

Having described the invention, what is claimed as new in support of Letters Patent is:

1. A wheel structure for model vehicles which makes use of an axle of straight right cylindrical form at the wheel bearing area, said structure comprising a hub having inside and outside faces, means forming a central bearing aperture therein extending through said inside face, an enlarged annular pocket in communication with said aperture having opposite parallel respectively inside and outside walls, a block of synthetic plastic resin material having an axial bore therethrough of diameter providing a snug releasable grip on said axle, said block having an outside diameter less than the inside diameter of said pocket and a length less than the length of said pocket, said block having opposite substantially flat radially extending parallel surfaces, said surfaces being parallel to said inside and outside parallel walls of the pocket, an outer portion of said pocket including structure forming said outside wall overlying and adjacent surface of said block whereby to retain the hub on the axle.

2. A wheel structure as in claim 1 wherein there is a bearing support between the hub and the axle on opposite sides of said pocket.

3. A wheel structure as in claim 2 wherein the bearing support between the hub and the axle comprises axially aligned portions of the aperture of the same diameter extending through the material comprising the hub and wherein the axially aligned portions are on opposite sides of the pocket.

4. A wheel structure as in claim 1 wherein there is brake means on the hub at the side where the axle enters said bearing aperture.

5. A wheel structure as in claim 1 including a bearing sleeve located between said block and said inside face, said bearing sleeve having a bearing bore there-through surrounding and in bearing engagement with said axle, said bearing bore being in axial alignment with the axial bore in said block, the exterior of said bearing sleeve having a slip fit engagement with the hub adjacent said pocket, and retention means acting between the hub and the bearing sleeve for holding the bearing sleeve and the block in the hub.

6. A wheel structure for model vehicles which makes use of an axle of straight right cylindrical form at the wheel bearing area, said structure comprising a hub, means forming a central bearing aperture therein, an enlarged annular pocket in communication with said aperture, a block of synthetic plastic resin material having an axial bore therethrough of diameter providing a snug releasable grip on said axle, said block having an outside diameter less than the inside diameter of said pocket and a length less than the length of said pocket, an outer portion of said pocket including structure overlying an adjacent end of said block whereby to retain the hub on the axle said retention means comprising a split collar having a circumferential flange and an annular recess in the hub surrounding said flange and in which said flange is releasably engaged.

7. A wheel structure for model vehicles which makes use of an axle of straight right cylindrical form at the wheel bearing area, said structure comprising a rotatable wheel hub means having a first bearing aperture therein, an enlarged annular pocket having a bottom adjacent said aperture and an open end opposite therefrom, a block of synthetic plastic resin material in the pocket with an axial bore therethrough of diameter providing a snug releasable grip on said axle and a lock washer for the block surrounding the axle and having an engagement with the hub at the open end of the pocket, a brake housing on the hub having an annular cylindrical wall forming a brake chamber at the open end of said pocket and including a friction braking element, and a brake assembly in said chamber comprising a stationary hub for the vehicle having a second bearing aperture in axial alignment with said first bearing aperture, a brake shoe member extending around and in non-rotatable engagement with said hub, a first brake actuating sleeve having a non-rotatable and axially shiftable mounting on said shaft, a second brake actuating sleeve having a rotatable mounting on said shaft and including means for effecting rotation, said brake actuating sleeves having mutually coacting cam means operable when the second sleeve is rotated to shift the first sleeve and said brake shoe member into frictional braking engagement with the friction braking element.

8. A wheel structure as in claim 7 wherein said lock washer is a split washer of resilient plastic resin material with a substantially annular groove and wherein there is an annular inwardly facing bead in said pocket releasably receptive of said annular groove.

9. A wheel structure as in claim 7 wherein said friction braking element is a substantially annular synthetic plastic element in non-rotatable engagement with the brake housing, said synthetic plastic element having an annular face and wherein said brake shoe member is an annular flange on said first brake actuating sleeve.

10. A wheel structure as in claim 9 wherein said annular synthetic plastic element has a rotatable support on said annular flange of the brake shoe member.

11. A wheel structure as in claim 7 wherein said friction braking element extends as a cylindrical surface around the interior of said brake housing and said brake shoe member comprises radially extendable shoe elements.

12. A wheel structure as in claim 11 wherein complementary cam means respectively on said shoe elements and said first brake actuating sleeve act to extend said shoe elements.

13. A wheel structure as in claim 12 wherein there is a coil spring extending around said shoe elements biased to retract said shoe elements.

14. A wheel structure as in claim 12 wherein there is a radially extending brake lever on said second brake actuating sleeve and spring means between said lever and said stationary hub biased in a direction to return said lever into brake release position.

* * * * *